(12) United States Patent
Delehouze et al.

(10) Patent No.: US 10,906,841 B2
(45) Date of Patent: Feb. 2, 2021

(54) POROUS CERAMIC MATERIAL OBTAINED BY WEAVING AND ACOUSTIC PANEL INCLUDING SUCH A MATERIAL

(71) Applicant: Safran Nacelles, Gonfreville l'Orcher (FR)

(72) Inventors: Arnaud Delehouze, Sainneville sur Seine (FR); Sylvain Sentis, Le Havre (FR); Bertrand Desjoyeaux, Sainte Adresse (FR)

(73) Assignee: Safran Nacelles, Gonfreville l'Orcher (FR)

( * ) Notice: Subject to any disclaimer, the term of this patent is extended or adjusted under 35 U.S.C. 154(b) by 0 days.

(21) Appl. No.: 15/878,443

(22) Filed: Jan. 24, 2018

(65) Prior Publication Data

US 2018/0148381 A1    May 31, 2018

Related U.S. Application Data

(63) Continuation of application No. PCT/FR2016/051935, filed on Jul. 25, 2016.

(30) Foreign Application Priority Data

Jul. 24, 2015    (FR) ...................................... 15 57094

(51) Int. Cl.
*B32B 3/10* (2006.01)
*C04B 35/80* (2006.01)
(Continued)

(52) U.S. Cl.
CPC ............ *C04B 35/803* (2013.01); *C04B 30/02* (2013.01); *C04B 35/117* (2013.01); *C04B 35/18* (2013.01);
(Continued)

(58) Field of Classification Search
None
See application file for complete search history.

(56) References Cited

U.S. PATENT DOCUMENTS

| 6,418,973 | B1 * | 7/2002 | Cox | .......................... | B32B 5/26 |
| | | | | | 139/383 R |
| 2008/0224343 | A1 | 9/2008 | Baldwin et al. | | |
| 2014/0161626 | A1 * | 6/2014 | Podgorski | ............... | C04B 35/64 |
| | | | | | 416/96 R |

FOREIGN PATENT DOCUMENTS

| EP | 1013412 | 6/2000 |
| FR | 2999173 | 6/2014 |
| (Continued) | | |

OTHER PUBLICATIONS

International Search Report for International Application PCT/FR2016/051935, dated Oct. 25, 2016.

*Primary Examiner* — Christopher M Polley
(74) *Attorney, Agent, or Firm* — Burris Law, PLLC (57) ABSTRACT

The present disclosure concerns a porous body made of a ceramic-matrix composite material for an acoustic attenuation panel and a method of manufacturing the porous body. The porous body includes a plurality of interwoven ceramic fibers, a metal oxide matrix, and a plurality of channels interwoven with the ceramic fibers and interconnected together. The channels define at least one cavity. In one form, at least one channel is wrapped around a ceramic fiber. In another form, at least one ceramic fiber and at least one channel are twisted together. In yet another form, at least one channel is wrapped around a ceramic fiber and twisted with the ceramic fiber. The present disclosure also concerns an acoustic attenuation panel including the porous body and an aircraft propulsion unit having such a panel.

15 Claims, 3 Drawing Sheets

(51) Int. Cl.
  *C04B 35/117*  (2006.01)
  *C04B 38/00*  (2006.01)
  *F02C 7/045*  (2006.01)
  *C04B 35/18*  (2006.01)
  *F02C 7/24*  (2006.01)
  *C04B 30/02*  (2006.01)
  *G10K 11/162*  (2006.01)
  *C04B 111/52*  (2006.01)
  *B32B 19/04*  (2006.01)

(52) U.S. Cl.
  CPC .............. *C04B 35/80* (2013.01); *C04B 38/00* (2013.01); *F02C 7/045* (2013.01); *F02C 7/24* (2013.01); *G10K 11/162* (2013.01); *B32B 19/04* (2013.01); *C04B 2111/52* (2013.01); *C04B 2235/5224* (2013.01); *C04B 2235/5228* (2013.01); *C04B 2235/5252* (2013.01); *C04B 2235/5256* (2013.01); *C04B 2235/616* (2013.01); *F05D 2300/6032* (2013.01); *F05D 2300/6034* (2013.01); *Y02T 50/60* (2013.01); *Y10T 428/24802* (2015.01)

(56) References Cited

FOREIGN PATENT DOCUMENTS

| | | |
|---|---|---|
| GB | 2294709 | 5/1996 |
| WO | 2010/012900 | 2/2010 |
| WO | 2014/118216 | 8/2014 |

* cited by examiner

POROUS CERAMIC MATERIAL OBTAINED BY WEAVING AND ACOUSTIC PANEL INCLUDING SUCH A MATERIAL

CROSS-REFERENCE TO RELATED APPLICATIONS

This application is a continuation of International Application No. PCT/FR2016/051935, filed on Jul. 25, 2016, which claims priority to and the benefit of FR 15/57094 filed on Jul. 24, 2015. The disclosures of the above applications are incorporated herein by reference.

FIELD

The present disclosure relates to the field of acoustic attenuation panels intended to equip the hot areas of ejecting gases of an aircraft turbojet engine. More specifically, the present disclosure concerns a body made of a ceramic-matrix composite material for an acoustic attenuation panel. The present disclosure also concerns an acoustic attenuation panel including such a body and an aircraft propulsion unit comprising such a panel. Finally, the present disclosure concerns a method for manufacturing a body made of a ceramic-matrix composite material.

BACKGROUND

The statements in this section merely provide background information related to the present disclosure and may not constitute prior art.

As known per se, the aerodynamic surfaces in the proximity of the hot gases ejection of a turbojet engine and which guide the aerodynamic flows are subjected to high temperatures which may reach 600° C. to 1000° C.

In order to contribute to the reduction of the noise emitted by the turbojet engine in operation, these surfaces are also provided with acoustic attenuation devices in the form of porous surfaces associated with resonant cavities.

In general, such parts are made of metallic structures in particular based on a Titanium or Nickel alloy, which makes them heavy.

Such parts may be made using ceramic-matrix composite sandwiches such as for example according to the document WO 2014/118216. But these methods are very expensive in particular because of the vapor-phase densification operations.

SUMMARY

The present disclosure provides a porous body made of a ceramic-matrix composite material for an acoustic attenuation panel, the porous body comprising:
a plurality of interwoven ceramic fibers;
a ceramic matrix; and
a plurality of channels interwoven with said ceramic fibers and interconnected together, said channels defining at least one cavity,
remarkable in that at least one channel is wrapped around a ceramic fiber and/or in that at least one ceramic fiber and at least one channel are twisted together.

According to optional characteristics of the porous body according to the present disclosure:
the channels are orientated according to different directions, in particular in the weft direction and/or in the warp direction of the ceramic fibers;
at least one ceramic fiber has a titer comprised between 50 grams/1000 meters and 2500 grams/1000 meters for densities comprised between 2.2 and 4;
at least one channel has an ovoid section with a minor axis comprised between 0.05 mm and 5 mm and with a major axis comprised between 0.05 mm and 10 mm;
the volume ratio of the channels of the porous body is comprised between 2% and 95% of said body, and in one form is between 50% and 90%; and/or
the porous body according to the present disclosure comprises at least one aero-acoustic surface and at least one channel interconnected to at least one cavity with said at least one aero-acoustic surface.

The present disclosure also concerns an acoustic attenuation panel, comprising:
an inner layer;
an outer layer having an acoustic permeability and intended to come into contact with an air flow to be acoustically attenuated; and
an intermediate layer between the inner and outer layers;
said panel being remarkable in that at least one of the intermediate or outer layers comprises a porous body according to the present disclosure.

In a first variant, the acoustic attenuation panel of the present disclosure is remarkable in that the outer and inner layers belong to the porous body according to the present disclosure.

In a second variant, the acoustic attenuation panel of the present disclosure comprises:
an inner layer; and
a cellular intermediate layer; and
an outer layer adjacent to the cellular intermediate layer and having an acoustic permeability, intended to come into contact with an air flow to be acoustically attenuated;
said panel being remarkable in that said outer layer comprises a porous body according to the present disclosure.

The present disclosure further concerns a method for manufacturing a porous body made of a ceramic-matrix composite material comprising the following steps aiming at:
weaving a preform by means of ceramic fibers and fugitive material fibers so that:
at least one ceramic fiber and at least one fugitive material fiber are twisted together, and/or
at least one fugitive material fiber is wrapped around a ceramic fiber;
drape-forming the preform on a tooling; and
proceeding to the sintering of the whole, at a temperature allowing to eliminate the fugitive material fibers, so as to form a plurality of channels interwoven with the ceramic fibers and interconnected together, said channels defining at least one cavity.

According to an optional feature of the manufacturing method of the present disclosure, the preform comprises:
a plurality of warp fibers among which at least one of said fibers is a warp ceramic fiber and at least one of said fibers is a fugitive material fiber; and/or
a plurality of weft fibers among which at least one of said fibers is a weft ceramic fiber and at least one of said fibers is a fugitive material fiber.

According to optional features, the method includes, after the drape-forming step and before the sintering step, the steps of:
scattering ceramic powders between the ceramic fibers and the fugitive material fibers, or infiltrating ceramic powders or a preceramic matrix between the ceramic fibers and the fugitive material fibers with a liquid medium; and drying and/or polymerizing the set constituted by the preform and by the ceramic powders or the preceramic matrix.

According to optional features, the method includes, before the drape-forming step, the step of impregnating the ceramic fibers with a ceramic or with a preceramic matrix.

According to optional features, the preform is made partially or entirely by depositing ceramic fibers and fugitive material fibers by implementing an automated drape-forming method.

The fugitive material of the fugitive material fibers includes:

one or several materials selected among the thermoplastic plastic materials and the thermosetting plastic materials, or a metal with a low melting point, in particular lower than the sintering temperature such as lead, tin, aluminum.

The present disclosure also relates to an aircraft propulsion unit (that is to say the set formed by a turbojet engine equipped with a nacelle, the set may include the engine mast), the propulsion unit comprising at least one acoustic attenuation panel as defined hereinabove and/or obtained by the method defined hereinabove.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Reference is now made to FIGS. 1, 2a, 2b and 2c. The acoustic attenuation panel 1 may equip one or several component(s) of an aircraft turbojet engine nacelle. In particular, the acoustic attenuation panel may be installed on any component located in a hot area of a propulsion unit, such as for example the ejection cone ("plug") of the hot gases of the turbojet engine, the inner fixed structure (IFS for "inner fixed structure" or IFD for "inner fixed duct") which channels the secondary flow around the hot body of the engine, the flow mixer duct (MFN for "mixed fan nozzle") and more generally any component of the propulsion unit (including the turbojet engine, the nacelle, and the engine mast) intended to attenuate a noise level in a hot area, that is to say exposed to temperatures higher than 300° C.

Figures 1, 2A:
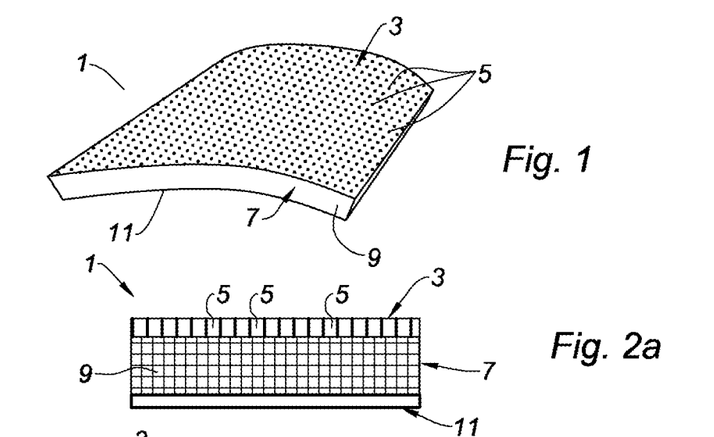
FIG. 1 schematically illustrates an acoustic attenuation panel according to the present disclosure.
FIG. 2a is a cross-sectional view of the acoustic attenuation panel of FIG. 1 according to a first form of the present disclosure.

The acoustic attenuation panel 1 comprises an outer layer 3 which comes into contact with an air flow to be acoustically attenuated when the panel equips a nacelle component, an intermediate layer 7 intended to absorb the acoustic energy, and an acoustically impermeable inner layer 11 essentially constituted by a tight surface inhibiting the free propagation of the waves and positioned so as to sandwich the intermediate layer 7 with the outer layer 3.

FIG. 2a shows a section of a first configuration of an acoustic attenuation panel according to the present disclosure, including an outer layer 3 having an acoustic permeability obtained thanks to a plurality of perforations 5, communicating with the intermediate layer 7 constituted with a porous body 9 according to the present disclosure achieving the acoustic attenuation of the panel.

Figure 2B:
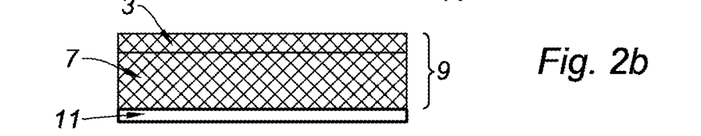
FIG. 2b is a cross-sectional view of the acoustic attenuation panel of FIG. 1 according to a second form of the present disclosure.

FIG. 2b shows a variant of an acoustic attenuation panel according to the present disclosure comprising an inner layer 11 and an outer layer 3 adjacent to said inner layer 11, coming into contact with an air flow to be acoustically attenuated when the panel 1 equips a nacelle component and having an acoustic permeability obtained thanks to the porous body 9 according to the present disclosure, achieving the acoustic attenuation of the panel. The nature and the characteristics of the permeability changing according to the thickness, the outer layer 3 in direct contact with the acoustic flow has specific porosity and permeability allowing to capture a portion of the acoustic flow. In turn, the intermediate flow 7 has a porosity intended to dampen the acoustic wave.

Figure 2C:
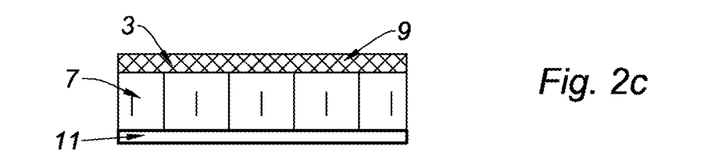
FIG. 2c is a cross-sectional view of the acoustic attenuation panel of FIG. 1 according to a third form of the present disclosure.

FIG. 2c shows another variant of an acoustic attenuation panel according to the present disclosure in which the porous body 9 forms the thick outer layer 3 close to the surface and whose permeability is selected so as to capture the acoustic flow.

Figure 3:
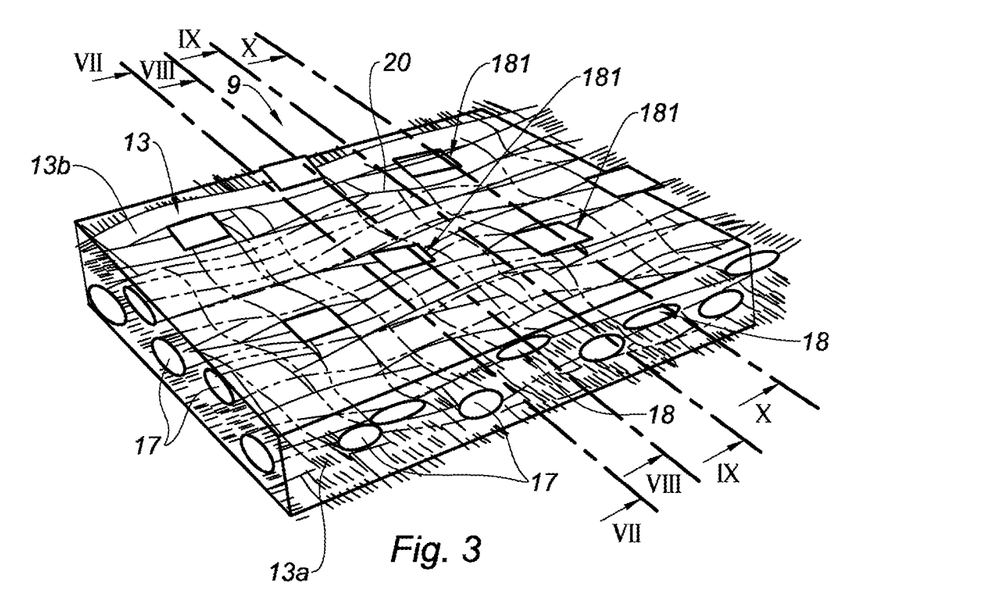
FIG. 3 is an isometric view of a porous body according to the present disclosure.

Reference is now made to FIG. 3 illustrating the porous body 9 equipping the panel 1. More particularly, FIG. 3 and FIGS. 7 to 10, describe a woven material suitable for making the variant according to FIG. 2b of a porous body according to the present disclosure.

The porous body 9 is of the type made of a ceramic-matrix composite material, for example a metal oxide-based ceramic matrix. Advantageously, the matrix may comprise at least two different ceramic materials. Thus, the local characteristics of the matrix are adapted according to the constraints.

The porous body 9 comprises a plurality of ceramic fibers 13 which may be constituted, without limitation, by a material based on a metal oxide, alumina, charged or uncharged aluminosilicates, alkali and alkaline-earth oxides or zirconia.

The porous body 9 comprises warp ceramic fibers 13a and weft ceramic fibers 13b.

The porous body 9 comprises a matrix 15 (shown in FIGS. 7 to 10) binding the ceramic fibers together, obtained by sintering powders of metal oxides, aluminas or charged or uncharged aluminosilicates.

According to the present disclosure, the porous body 9 comprises a plurality of channels 17 or tunnels, interwoven with the ceramic fibers 13. The channels 17 are interconnected together. The network of channels 17 interconnected together defines one or several cavity/cavities or cavernous volume(s) conferring the desired porosity to the body 9. The porosity conferred to the body 9 by the channels 17 allows attenuating the noise when the body constitutes or is part of an acoustic panel.

Referring to the variant of an acoustic panel according to FIG. 2b or 2c, the porous body 9 comprises a plurality of channels 18 arranged so as to communicate with the upper surface 20 of the porous body 9 at surfaces 181 called "aero-acoustic" surfaces. These aero-acoustic surfaces 181 constitute openings of the porous material with the acoustic flow to attenuate and achieve via the channels 18 interconnections with the channels 17 of the porous body 9 and with the upper face 20 of the porous body 9. The channels 17 and 18 are obtained by the manufacturing method according to the present disclosure described hereinbelow.

Figure 4:
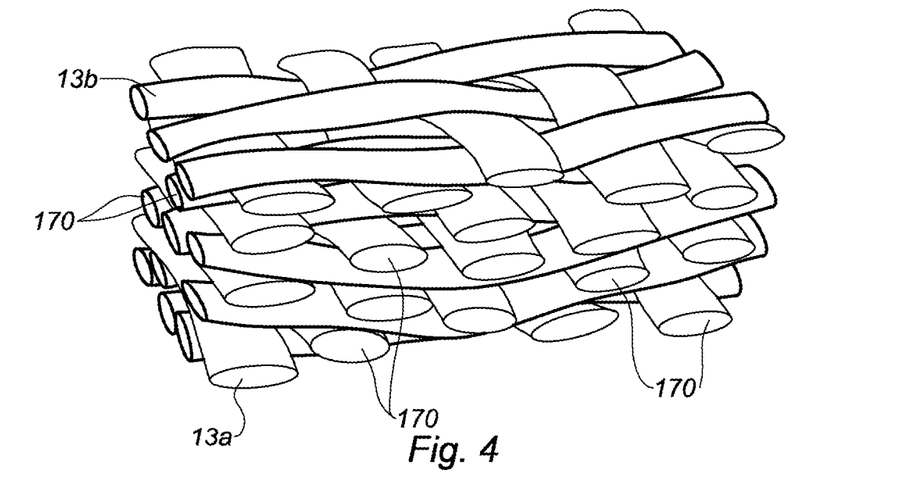
FIG. 4 is an isometric view of a woven preform intended to form a porous body according to the present disclosure.

The method for manufacturing the porous body according to the present disclosure comprises a first step aiming at weaving a preform 90. The preform 90 is represented in FIG. 4. The preform 90 is obtained by a weaving braiding method known to those skilled in the art, by means of a non-represented weaving loom.

The woven preform 90 comprises warp ceramic fibers 13a and weft ceramic fibers 13b.

The term "ceramic fibers" herein defines rovings constituted by a set of filaments, the number of filaments per roving being comprised between about 200 and 10000 filaments. For metal oxides whose density varies between 2.2 and 4, ceramic fibers are selected, whose titer is comprised between 50 grams/1000 meters and 2500 grams/1000 meters, having good weaving properties. For example, for alumina oxide fibers, it is possible to use fibers produced by the company 3M and commercialized under the commercial name Nextel®. It is possible to use fibers of different grades having different densities, such as Nextel® 312 with a density 2.7, Nextel® 440 with a density 3.05, Nextel® 550 with a density 3.03, Nextel® 610 with a density 3.9, Nextel® 720 with a density 3.4.

According to the present disclosure, the ceramic fibers 13 of the preform are interwoven with fibers 170 of a material called "fugitive" material. The fugitive material fibers 170 are interconnected together.

In the present application, "fugitive material" means a material able to be at least partially or totally eliminated by a heat treatment during the implementation of the method for manufacturing the porous body. During the applied heat treatment, the action of the temperature causes the elimination of the fugitive material fibers, in particular by oxidation, combustion, fusion, evaporation, or sublimation.

The term "fugitive material fiber" defines a roving constituted by several fugitive material filaments. The term "fugitive material fiber" may also define a roving constituted by monofilament yarns or monofilaments.

As a non-limiting example, a fugitive material fiber 170 may be constituted by one or several material(s) immiscible with the powders of metal oxides, aluminas or charged or uncharged aluminosilicates constituting the matrix of the porous body (after sintering of these powders). The fugitive material is selected so as to be destroyed during the step of sintering the powders. As example, the fugitive material includes one or several material(s) selected among the thermoplastic plastic materials (such as polyethylene), the thermosetting plastic (for example epoxy-based) materials, and the metals with a low melting point (for example, based on aluminum, tin or lead).

A fugitive material fiber 170 may also be constituted by an assembly of metals having a melting point lower than or equal to the temperature applied for sintering the powders. These materials may be lead, tin or aluminum based alloys. In the case of metal fibers, these are selected with a limited section, in order to be flexible enough to be woven or drape-formed with the ceramic fibers. The fugitive material fiber is then destroyed, when the rise in temperature of the set for sintering the powders is carried out, when the melting temperature of the fugitive material is reached.

The preform of the acoustic panel according to the present disclosure may also be obtained by depositing fibers using a machine according to the known methods of automated drape-forming (in particular methods known under the name of AFP for "Automated Fiber Placement"), or of filament winding, the machine then being capable of depositing, according to different orientations and stacking and crossing sequences and using adapted devices, ceramic fibers and/or fugitive material fibers or the variants of combinations between ceramic fibers and fugitive material fibers.

Thus, according to the present disclosure, a porous ceramic composite with ceramic fibers is obtained, whose ceramic fibers are continuous within the porous or cavernous structure. The composite material made has then a structural strength which is directly dependent on the interweaving of the fibers with each other.

Unlike the conventional methods in which the acoustic openings are created by mechanical perforation and material removal, and therefore by sectioning of the fibers around the acoustic bores, the present disclosure allows preserving the continuous fibers while providing an acoustic porosity. Thus, the structure according to the present disclosure has no interrupted or sectioned fibers in the proximity of the free edges of the acoustic holes (which are usually crack initiation areas). The structure according to the present disclosure is therefore more robust than the known structures.

As illustrated in FIG. 4, the ceramic or fugitive material fibers of the preform have a substantially ovoid section. The minor axis of the ovoid may be comprised between 0.05 mm and 5 mm and the major axis may be comprised between 0.05 mm and 10 mm.

Of course, any other section shape may be considered, such as a circular, elliptical, rectangular section, etc.

The fugitive material fibers 170 may be disposed in a substantially collinear manner with the warp fibers 13a and/or with the weft fibers 13b, that is to say they are woven or disposed according to directions similar to the weaving and deposit directions as the ceramic fibers to which they are associated.

Figure 5:
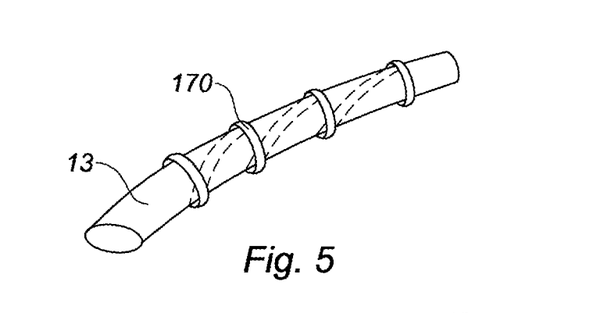
FIG. 5 illustrates a variant of an arrangement of a fugitive material fiber and of a ceramic fiber.

According to another variant represented in FIG. 5, a fugitive material fiber 170 may be wrapped around a ceramic fiber 13, that is to say that a fugitive material fiber defines a spiral around a ceramic fiber 13. In one form, a roving section of ceramic fibers comprised between 0.2 mm$^2$ and 10 mm$^2$ is selected on the one hand, a channel section wrapped around the ceramic fiber comprised between 0.02 mm$^2$ and 0.5 mm$^2$ on the other hand, and still on the other hand, a winding ratio from 1 turn for 1.5 times the section of the wrapped channel, to 1 turn for 3 times the width of the wrapped channel. For a fabric layer made with such wrapped fibers, channels with small sections, and porosities generally lower than 15%, and even lower than 5% are obtained. This configuration is particularly interesting to create acoustically permeable layers such as the outer layer 3 of the acoustic panel according to the present disclosure. It provides an adapted acoustic opening, with small orifices, which penalizes less the aerodynamic performance of the surfaces subjected to such a flow. This configuration may also be used at the level of the intermediate layer 7 of the acoustic panel according to the present disclosure in order to create an inner intermediate layer with a very fine permeability, for example to create an attenuator with a dual attenuation capability. This arrangement may be performed on all or part of the fibers of the preform.

Figure 6:
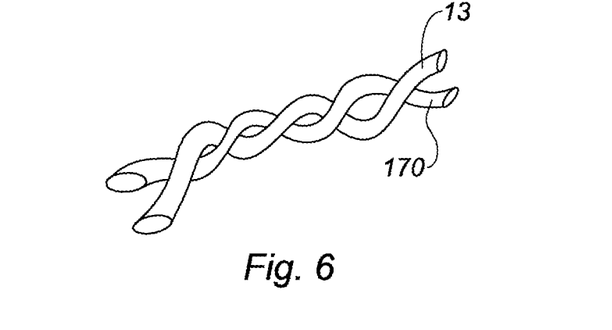
FIG. 6 illustrates another variant of an arrangement of a fugitive material fiber and of a ceramic fiber.

According to another variant represented in FIG. 6, a ceramic fiber 13 and a fugitive material fiber 170 may be twisted together. In one form, a section ratio between the roving of ceramic fibers and the twisted cavity comprised between 0.5 and 2 is selected on the one hand, and a ceramic fiber section comprised between 0.2 mm$^2$ and 10 mm$^2$ on the other hand, and still on the other hand, a twist ratio comprised between 3 turns per meter and 50 turns per meter. It is also possible to combine in the twisted set one or several ceramic fiber(s) with one or several twisted cavity/cavities. This arrangement allows in particular producing a more diffuse or continuous porosity within the same volume unit and a more diffuse or continuous distribution of fibers and porosities within the same volume unit. For the same volume unit, the number of independent rovings used to perform the weaving or the draping of the preform is also reduced, which reduces the costs of obtaining the preform.

This arrangement may be performed on all or part of the fibers of the preform.

The section or the arrangement of the fugitive material 170 of the preform 90 confers to the channels 17 the same section or arrangement in the porous body 9 when the fugitive material fibers 170 are eliminated.

When the step of weaving the preform 90 is completed, the method for manufacturing the porous body according to the present disclosure comprises a second step aiming at drape-forming the preform 90 on a tooling.

Alternatively to the two previous steps, the ceramic fibers and the fugitive material fibers are drape-formed by a fiber deposit or filament winding method, directly on the tooling or on a specific form to be disposed afterwards on the molding tooling.

Afterwards, the third step of the method of the present disclosure comprises scattering powders of metal oxides between the ceramic fibers and the fugitive material fibers.

Alternatively, the third step of the manufacturing method may comprise infiltrating powders of metal oxides between the ceramic fibers and the fugitive material fibers by means of a liquid medium.

Alternatively, the step of scattering the matrix in the different interstices of the fibers is carried out before the drape-forming of the preform. It is then said that the fibers are "pre-impregnated", the matrix being at this level in the form of ceramic powders, ceramic powder in solution or preceramic solutions.

A fourth step of the manufacturing method of the present disclosure comprises drying the set constituted by the preform and by the ceramic powders or the preceramic solution.

The consolidation of the ceramic composite material according to the present disclosure is finally performed by heating the set up to a sintering temperature of the constituents of the ceramic or preceramic matrix. The sintering temperature is typically comprised between 1000° C. and 1600° C., more particularly between 1200° C. and 1300° C. This allows consolidating the matrix and binding the ceramic fibers together via the matrix.

Moreover, the method of the present disclosure comprises a step of eliminating the fugitive material fibers so as to form a plurality of channels interwoven with the ceramic fibers and interconnected together, said channels defining at least one cavity.

This step is carried out either during the sintering of the set when the fugitive material fibers are constituted by an assembly of polymers such as those previously defined.

This step may also be carried out before reaching the sintering temperature, when the fugitive material fibers are constituted by an assembly of previously defined metals having a melting point lower than the sintering temperature.

Referring now to FIGS. 7 to 10, representing an example of a porous body 9 viewed in section according the lines VII-VII, VIII-VIII, IX-IX and X-X of FIG. 3, obtained after implementing the manufacturing method of the present disclosure.

Figure 7:
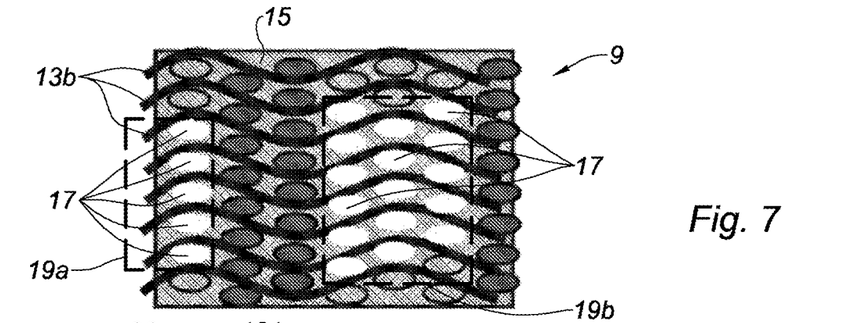
FIG. 7 is a sectional view of the porous body according to lines VII-VII of FIG. 3.

FIG. 7 illustrates the porous body 9, comprising a plurality of warp 13*a* and weft 13*b* ceramic fibers interwoven with the channels 17 in the weft direction, which channels are obtained by heat treatment of the fugitive material fibers applied to the preform during the method for manufacturing the porous body. The channels 17 define a plurality of cavities 19*a*, 19*b* of the body 9, conferring the porosity to said body.

Figure 8:
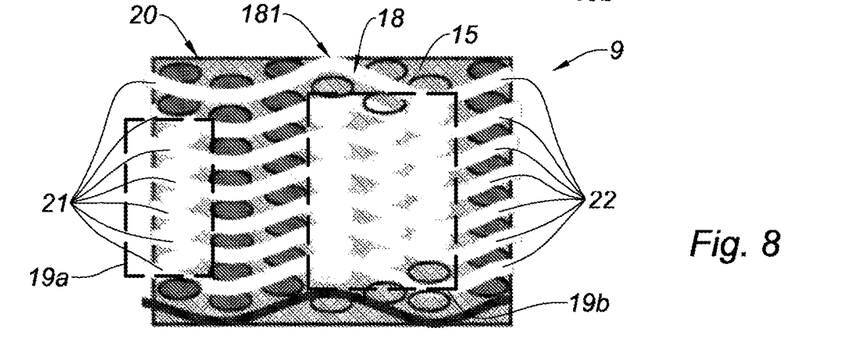
FIG. 8 is a sectional view of the porous body according to lines VIII-VIII of FIG. 3.

FIG. 8 illustrates the porous body 9 on which we notice the cavities 19*a*, 19*b* in the weft direction as well as seven channels 22 in the warp direction, obtained by heat treatment of seven fugitive material fibers disposed in the warp direction. The channels 22 herein define cavities 21 in the warp direction, in addition to the cavities 19*a*, 19*b* in the weft direction. The acoustic permeability of the porous body 9 with the aero-acoustic flow, is obtained by the channel 18 which, on the one hand, is connected with the cavity 19*b* and which, on the other hand, has an aero-acoustic surface 181 communicating with the upper surface of the porous body 9.

Figure 9:
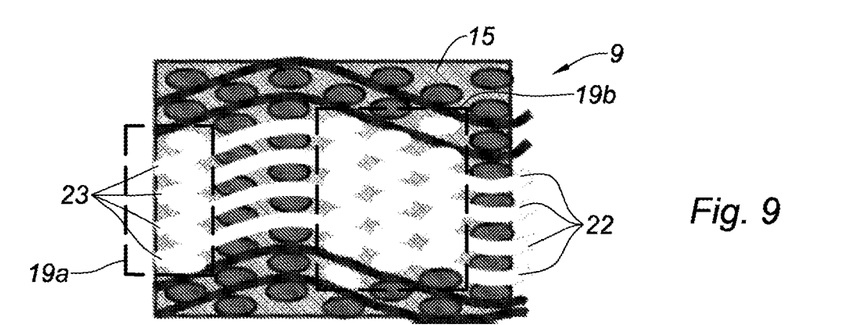
FIG. 9 is a sectional view of the porous body according to lines IX-IX of FIG. 3.

In FIG. 9, the same cavities 19*a*, 19*b* in the weft direction of the porous body 9 are shown, and four channels 22 in the warp direction, obtained by heat treatment of four fugitive material fibers disposed in the warp direction are illustrated.

These channels 22 herein define cavities 23 in the warp direction, in addition to the cavities 21 in the warp direction and to the cavities 19*a*, 19*b* in the weft direction.

Figure 10:
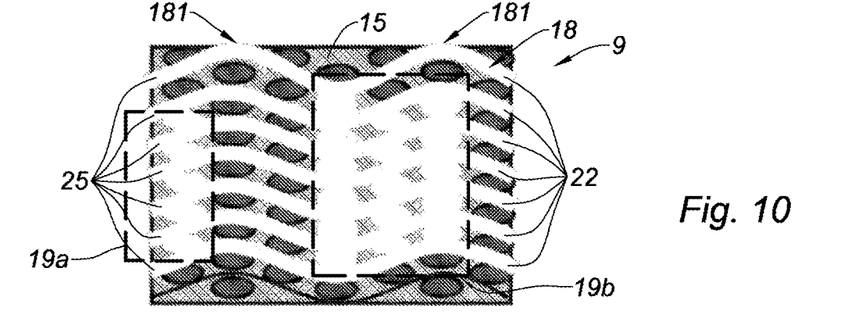
FIG. 10 is a sectional view of the porous body according to lines X-X of FIG. 3.

In FIG. 10, the same cavities 19*a*, 19*b* in the weft direction of the porous body 9 are shown, and seven channels 22 in the warp direction, obtained by heat treatment of seven fugitive material fibers disposed in the warp direction are illustrated.

These channels 22 herein define cavities 25 in the warp direction, in addition to the cavities 21 and 23 in the warp direction and to the cavities 19*a*, 19*b* in the weft direction.

In FIG. 10, on the other hand, a cavity 18 reproduces an acoustic permeability with the upper surface 20 of the porous body, by being connected, on the one hand, with at least one cavity 19*a* or 19*b*, and in two aero-acoustic surfaces 181 communicating with the upper surface of the porous body 9.

All cavities 19*a*, 19*b*, 21, 23 and 25 define a porosity network of the body 9, conferring acoustic attenuation properties to the body 9.

As a non-limiting example, the volume ratio of the cavities 19*a*, 19*b*, 21, 23 and 25 varies between 5% and 95% of the body, and according to one form, between 50% and 90%.

In the example described in FIGS. 3, 7 to 10, it is also possible to observe an upper area of the preform having a limited porosity, corresponding to the outer layer 3 of the acoustic panel. In particular, in FIGS. 8 and 10, the channels 18 in the warp direction are interwoven so as to run along the free surface of the panel in 181, thereby conferring the acoustic permeability of this surface. The intermediate layers of the preform, corresponding to the intermediate layer 7 of the acoustic panel, include a much more significant proportion of cavities. And finally, the lower area, corresponding to the inner layer 11 of the acoustic panel, includes no cavities.

The arrangement of the ceramic fibers as well as the geometric distribution of the foregoing cavities have been given only as an illustrative example of the present disclosure, the porous body according to the present disclosure being in no way limited to the previous examples.

In particular, it is possible to consider providing, in the porous body according to the present disclosure, an area devoid of channels across a thickness of the preform, which allows defining within the porous body a substantially tight area inhibiting the free propagation of the sound waves.

It is also provided to vary the titers of the used fibers and the interweaving patterns, either according to the thick layers of the preform, or distributed by areas of the preform. This allows making the acoustic porosity vary within a thick layer or between the different thick layers, and thus treating different ranges of acoustic frequencies.

As previously stated with reference to FIG. 2*a*, the porous body manufactured accordingly may be assembled with the inner layer 11 essentially constituted by a tight surface inhibiting the free propagation of the waves, and with the outer layer 3 having an acoustic permeability obtained thanks to a plurality of perforations 5 communicating with said porous body 9. As example, the surface ratio of communication of the perforations 5 of the outer layer 3 with the channels 17 of the porous body 9 is comprised between 2% and 20%.

Alternatively, as represented by FIG. 2*b*, the acoustic panel 1 comprises the tight inner layer 11 and the porous body 9 adjacent to said inner layer 11.

According to a first variant not represented in the figures, the acoustic panel is constituted by one single preform including three thick layers into one single constitution: the outer layer 3, the inner layer 11 and the intermediate layer 7.

According to a non-represented second variant, the acoustic panel is constituted by a stacking of distinct preforms in order to create either each one of the three layers independently, or two adjacent layers of the panel (the outer layer 3 and the intermediate layer 7, or the intermediate layer 7 and the inner layer 11, into one single preform).

According to a non-represented third variant, the porous body is obtained from the successive deposit of ceramic and fugitive material fibers according to different alternations and different orientations producing an interweaving of ceramic fibers and channels after addition of the matrix, sintering an elimination of fugitive material.

Advantageously, the preform of ceramic fibers constituting at least two adjacent layers of the acoustic panel comprises ceramic fibers belonging to both these two layers. At least one ceramic fiber is interwoven with at least one ceramic fiber of the outer layer 3 (respectively of the intermediate layer 7) with at least one ceramic fiber of the intermediate layer 7 (respectively of the inner layer 11). The two adjacent layers of the panel are then mechanically bound by ceramic fibers. The structure is therefore more robust, and will better resist damages and risks of delaminations.

In another form, FIG. 2*c* presents an acoustic panel constituted by an inner layer 11 hermetic to the free propagation of the acoustic waves, an intermediate layer 7 constituted by a cellular core, and an outer layer 3 made according to one form according to the present disclosure. The cellular core and the inner layer are made of materials and by methods known to those skilled in the art, such as a laminate for the layer 11 and a metallic or ceramic honeycomb-type material for the layer 7. For example, the layer 3 according to the present disclosure is bonded to the layer 7 by a ceramic glue. The cavities of the preform 9 according to the present disclosure have an acoustic permeability comprised between 3 and 20%, channels 18 in the preform 90 achieve the interconnection between the aero-acoustic surfaces 181 of the upper surface and the cavities of the cellular core.

It is also possible to consider using ceramic fibers with a fugitive material wrapped around according to the variant of FIG. 5, in order to obtain low ratios of porosities throughout a layer while having a more even distribution. In particular for the surface layers of the outer layer 3, and in particular the aero-acoustic surface layer, this configuration has very small interconnection unit surfaces. The drag induced on the aerodynamic flow is therefore reduced.

It is also possible to consider using ceramic fibers with a wrapped fugitive material, to create an intermediate fabric layer within the thickness of the intermediate layer 7, in order to create an intermediate microporous septum. Thanks to such an arrangement, it is possible to create in the thickness of the panel, two mating acoustic attenuation sub-areas.

It is also possible to consider making all or part of the porous body 9 according to the present disclosure by an automated drape-forming method comprising depositing fibers in successive layers or strips and according to different orientations on the surface to mold. Alternatively, it is possible to use the different types of ceramic fibers, fugitive material fibers, independently or in wrapped or twisted combination. The ceramic fibers may be pre-impregnated beforehand with ceramic powders or with a preceramic matrix in a viscous form, compatible with automated drape-forming methods, allowing to eliminate or reduce the operations of infiltrating ceramic powder or preceramic matrix before the consolidation. The cross-linking of fugitive material fibers according to the different directions and to the different successive layers conferring to the obtained structure, after the operations of sintering and fugitive material elimination, sets of cavities (at least partially) interconnected together and conferring the porosity to the acoustic panel enabling the acoustic attenuation by said panel.

Thanks to the present disclosure, we obtain a porous body made of a ceramic-matrix composite material, forming all or part of an acoustic attenuation panel having a network of cavities providing the acoustic attenuation of the panel.

The acoustic panel made of a ceramic-matrix ceramic material can equip hot areas of a propulsion unit of an aircraft.

Furthermore, the manufacturing method according to the present disclosure allows obtaining a porous body with communicating cavities in which the acoustic treatment is obtained during the sintering of the whole. The porous body obtained accordingly may then be used to constitute the cellular core and/or the permeable surface of a ceramic acoustic attenuation panel of a component of a turbojet engine nacelle.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A porous body made of a ceramic-matrix composite material for an acoustic attenuation panel, the porous body comprising:
a plurality of interwoven ceramic fibers;
a metal oxide matrix; and
a plurality of channels interwoven with said ceramic fibers, said plurality of channels being interconnected together and defining at least one cavity,
wherein at least one channel is wrapped around a periphery of a ceramic fiber along a length of the ceramic fiber and/or twisted together with at least one ceramic fiber, the channel being twisted together with the ceramic fiber along the length of the ceramic fiber and along a length of the at least one channel.

2. The porous body according to claim 1, wherein the channels are orientated in at least one of a weft direction and a warp direction of the ceramic fibers.

3. The porous body according to claim 1, wherein at least one ceramic fiber has a titer between 50 grams/1000 meters and 2500 grams/1000 meters for densities between 2.2 and 4.

4. The porous body according to claim 1, wherein at least one channel has an ovoid section having a minor axis between 0.05 mm and 5 mm and a major axis between 0.05 mm and 10 mm.

5. The porous body according to claim 1, wherein a volume ratio of the plurality of channels of the porous body is between 2% and 95% of said body.

6. The porous body according to claim 5, wherein the volume ratio of the plurality of channels of the porous body is between 50% and 90%.

7. The porous body according to claim 1 further comprising at least one aero-acoustic surface, wherein the at least one channel interconnects at least one cavity with said at least one aero-acoustic surface.

8. An acoustic attenuation panel, comprising:
an inner layer;
an outer layer having an acoustic permeability and in contact with an air flow to be acoustically attenuated; and
an intermediate layer between the inner and outer layers, wherein at least one of the intermediate layer and the outer layer comprises a porous body according to claim 1.

9. The acoustic attenuation panel according to claim 8, wherein both the outer and intermediate layers comprise a porous body.

10. The acoustic attenuation panel according to claim 8, wherein at least one portion of the ceramic fibers of the outer layer is interwoven with a portion of the ceramic fibers of the intermediate layer.

11. The acoustic attenuation panel according to claim 8, wherein the inner layer comprises a porous body and at least one portion of the ceramic fibers of at least one of the inner layer and outer layer is interwoven with a portion of the ceramic fibers of the intermediate layer.

12. An aircraft propulsion unit comprising at least one acoustic attenuation panel according to claim 8.

13. A porous body made of a ceramic-matrix composite material for an acoustic attenuation panel, the porous body comprising:
a plurality of interwoven ceramic fibers;
a metal oxide matrix; and
a plurality of channels interwoven with said ceramic fibers, said plurality of channels being interconnected together and defining at least one cavity,
wherein at least one channel is wrapped around a periphery of a ceramic fiber along a length of the ceramic fiber.

14. A porous body made of a ceramic-matrix composite material for an acoustic attenuation panel, the porous body comprising:
a plurality of interwoven ceramic fibers;
a metal oxide matrix; and
a plurality of channels interwoven with said ceramic fibers, said plurality of channels being interconnected together and defining at least one cavity,
wherein at least one channel is twisted together with at least one ceramic fiber, the channel being twisted together with the ceramic fiber along the length of the ceramic fiber and along a length of the at least one channel.

15. A porous body made of a ceramic-matrix composite material for an acoustic attenuation panel, the porous body comprising:
a plurality of interwoven ceramic fibers;
a metal oxide matrix; and
a plurality of channels interwoven with said ceramic fibers, the channels being oriented in the weft direction and the warp direction of the ceramic fibers, said plurality of channels being interconnected together and defining at least one cavity,
wherein at least one channel is wrapped around a ceramic fiber and/or twisted together with at least one ceramic fiber.

* * * * *